FIG-2

June 7, 1949.   H. P. CURLEE   2,472,650
CONFECTION MAKING MACHINE
Filed April 11, 1947   7 Sheets-Sheet 4

Inventor:
HARVEY P. CURLEE

June 7, 1949.　　　　H. P. CURLEE　　　　2,472,650
CONFECTION MAKING MACHINE
Filed April 11, 1947　　　　　　　　　　　7 Sheets-Sheet 5

Inventor:
HARVEY P. CURLEE

By
Attorney

Patented June 7, 1949

2,472,650

UNITED STATES PATENT OFFICE 2,472,650

CONFECTION MAKING MACHINE

Harvey P. Curlee, near Charlotte, N. C.

Application April 11, 1947, Serial No. 740,854

7 Claims. (Cl. 91—3)

This invention relates to apparatus for depositing confectionery things and the like onto cakes, cookies and the like.

The apparatus embodies an endless conveyor having associated therewith a magazine divided into a plurality of compartments in which the cakes, cookies, wafers and the like are deposited together with a reciprocating plunger adapted to remove the lowermost article from each of the compartments of the magazine and deposit them onto the endless conveyor. The endless conveyor is provided with a plurality of cross members, each having a lip or forwardly projecting portion and the means for feeding the article from the magazines are so timed with the movement of the conveyor that the rear edge of the articles fed from the magazine will be deposited so that their rear lower portions will rest on the lip and their rear edges will rest against the front surface of the crosspiece.

Means are also provided for intermittently moving the conveyor as the articles are deposited from the magazines onto the conveyor. Also, a plurality of wires are disposed immediately below the conveyor and running longitudinally of the conveyor which support the forward lower edges of the articles and causes a slight grooving effect on the lower surfaces of the articles and prevent their lateral shifting relative to the conveyor.

A hopper is disposed above the conveyor, and is provided with a plurality of nozzles extending from the lower portion thereof, and the hopper is filled with the confectionery filling, and means are provided for feeding the confectionery filling from the lower ends of the nozzles extending downwardly from the hopper.

Also, a motion of translation is imparted to the hopper whereby it is moved longitudinally of the machine in the same direction as the endless conveyor to advance the articles so that the streams of confectionery filling are deposited from the rear to the front of the articles while the conveyor remains stationary, and then there is an elevating movement applied to the hopper so as to attenuate a stream of confectionery filling issuing from the nozzles associated with the hopper, thus serving to break the stream of filling so that unused portions will not fall onto the conveyor or through the conveyor.

As the streams of confectionery filling have reached the front edges of the articles on which the filling is deposited, and the hopper is given an elevated motion, the hopper is then given a backward motion to thus serve to not only break the stream of confectionery filling, but to lap the unused portion of the filling extending upwardly from the forward end of the cakes, cookies and the like back onto the previously deposited filling, thus providing a smooth deposit which will not overlap the edges of the cakes, cookies, wafers and the like.

The arrangement of the wires extending longitudinally of the endless conveyor not only prevent clogging of the machine, but also allows broken articles and any surplus filling to drop through the conveyor onto a suitable pan and the like, and thus prevents these surplus droplets of any filling material which might not be deposited on the cakes, wafers and the like from clogging up the conveyor and also avoids any sticking or jamming effect due to the smallness of the wire elements which are disposed immediately below the upper reach of the endless conveyor.

Also, if desired, there can be embodied in the invention a brake mechanism which includes a yieldable arrangement disposed for displacement during delivery of the filling material from the hopper so that the depositing action is reversed by recovery of the yieldable member following the depositing operation so as to assist in breaking the stream of filling material when sufficient quantity has been deposited on a cake and the like and when reverse movement has been given to the hopper.

Some of the objects of the invention having been stated, other objects will appear as the description proceeds, when taken in connection with the accompanying drawings, in which.

Referring more specifically to the drawings, the numerals 10, 11, 12 and 13 indicate four upright posts of the framework of the machine and the posts 10 and 13 are joined together by struts 9 and 15 and the posts 11 and 12 are joined together by struts 8 and 16. Resting on top of the posts 10 and 13 is an upper horizontal bar 17 and resting on top of the posts 11 and 12 is an upper horizontal bar 18. The posts 10 and 11 are also joined together by a strut 19, and posts 12 and 13 are joined together by a horizontal strut 20. One one end of the bars 17 and 18 are mounted blocks 25 and 26 which support pillow blocks 27 and 28 in which a shaft 29 is rotatably mounted. This shaft has sprocket wheels 30 and 31 secured thereon on which sprocket chains 32 and 33 are mounted. The sprocket chains 32 and 33 are also mounted on sprocket wheels 35 and 36 which are fixedly secured on a shaft 37 rotatably mounted in bearings 38, only one of which is shown in the drawings in Figure 1, but there is a similar bearing mounted on the lower side of bar 17, these bearings being secured to the lower side of the bars 17 and 18 and projecting downwardly.

The sprocket chains 32 and 33 are supported in their upper reach by bars 42 and 43 which are secured at one end to a cross-bar 44 and this end of the bars 42 and 43 are supported by upright supports 46 and 47 rising upwardly from the bars 18 and 17, respectively. The other ends of these bars 42 and 43 have secured between their ends a bar 50, the bars 42 and 43 near the cross bar 50 being secured to the proximate surfaces of the bars 17 and 18.

Figures 1, 15:
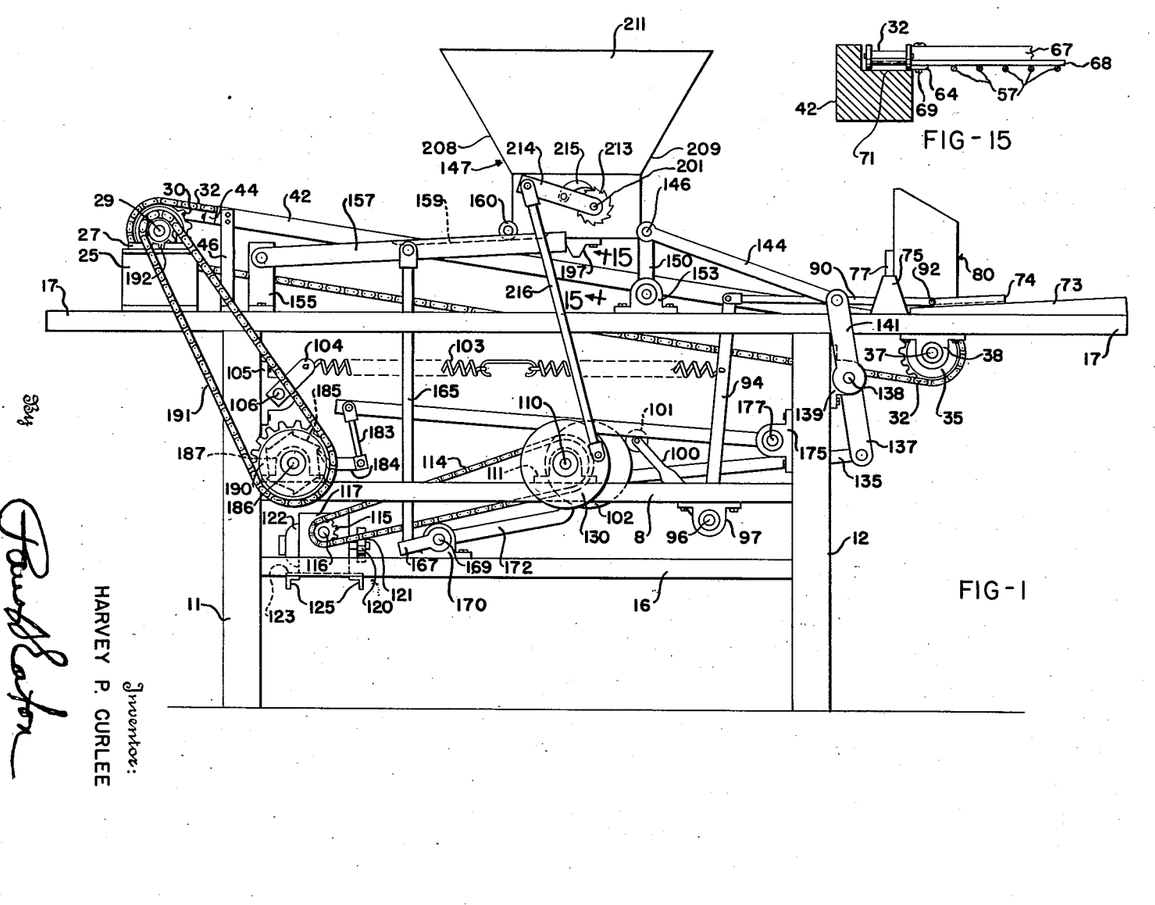
Figure 1 is a side elevation of the apparatus.
Figure 15 is a vertical sectional view taken substantially along the line 15—15 in Figure 1.
Figure 2:
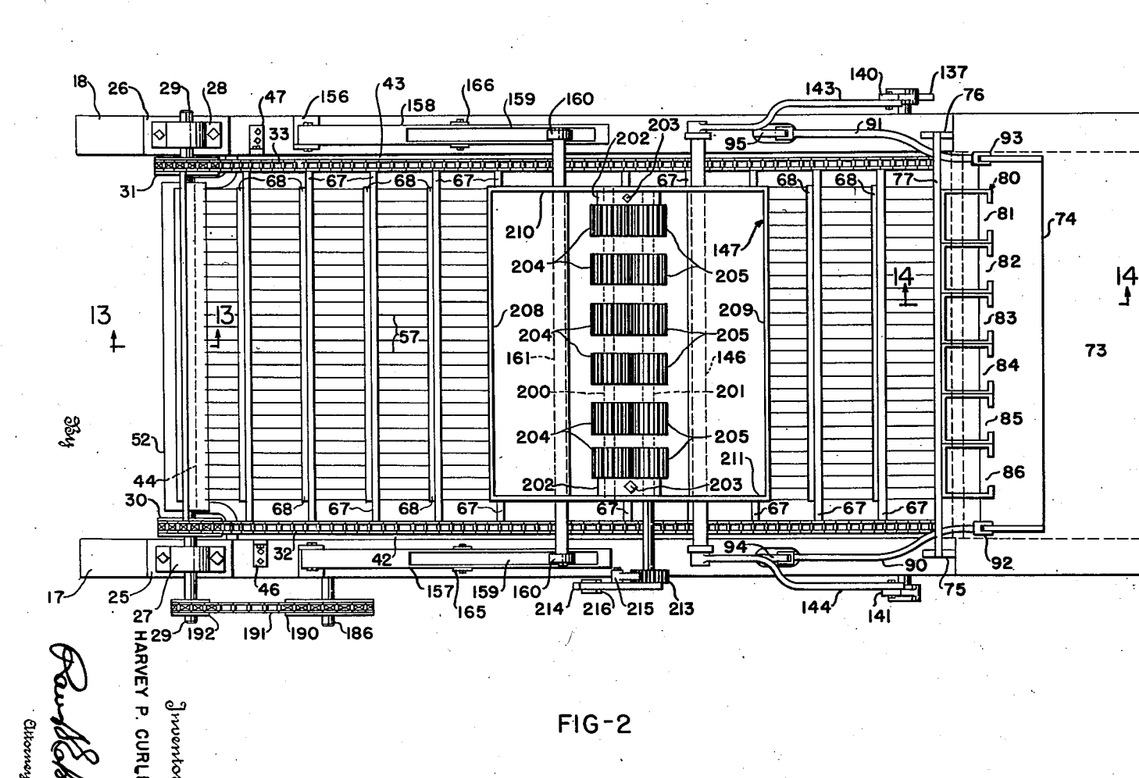
Figure 2 is a top plan view of the apparatus.

The cross bar 44 disposed at the left-hand end of Figures 1 and 2 has secured to its upper surface a plate 52 which projects out over and is bent downwardly over the shaft 29. This plate 52 has a plurality of perforations therein through which one end of spaced wires 57 pass and these bars 44 being of steel have tapped holes therein and the ends of the wires 57 are passed through the holes in the plate 52 and inserted in the tapped holes in bar 44 and a suitable screw 58 is threaded into each of these tapped holes to secure one end of the wires 57. The other end of the wires 57 are passed through a hole in a screw 60 which is tapped into suitable holes in the bar 50 and by turning the screws 60, the wires 57 can be wound around the screws 60 to tighten them like a banjo string, and when in tightened position, a suitable set screw 61 can be driven home to hold the screws 60 in position. The purpose of these wires 57 is to support the forward end of a cake, wafer, cookie or the like, and to cause the front end of these edible pieces to be slightly grooved to prevent lateral movement of the forward end of the cookies as will be presently described.

Certain of the links of the sprocket chains 32 and 33 have ears 64 projecting inwardly to which is secured the ends of cross bars 67 and the plates 68, by means of bolts 69, the plate 68 being substantially wider than the cross bar 67 to provide a ledge onto which the rear end of the cake, wafer or the like is adapted to rest while it is moved forwardly by the endless conveyor for purposes to be presently described.

The bars 42 and 43 are grooved as at 71 to provide a guideway for the sprocket chains 42 and 43. The right-hand end of the bars 17 and 18 in Figures 1 and 2 have secured on their upper surfaces and extending across between the two bars 17 and 18, a wedge shaped plate 73 on which is slidably mounted an ejecting plate 74. Secured on the upper surfaces of the bars 17 and 18 are supports 75 and 76 which support a cross bar 77 to which is secured by any suitable means such as screws 78, a magazine 80 having a plurality of compartments such as 81, 82, 83, 84, 85 and 86 which are adapted to hold a plurality of the cakes, cookies and the like designated at 87. The lower ends of the compartments 81 to 86 inclusive are spaced from the ejecting plate 74 so that when the ejecting plate 74 is not in operation, the lowermost cake in each compartment will rest on the wedge shaped plate 73.

The expelling plate 74 has pivoted thereto links 90 and 91 as at 92 and 93, the other end of said links being pivoted to the upper end of arms 94 and 95 which are fixed on an oscillatable shaft 96 mounted in bearings 97 and 98 secured to the lower surfaces of the horizontal struts 8 and 9 disposed between the posts 11 and 12 and 10 and 13, respectively. This shaft 96 has secured thereto one end of an arm 100 which has a roller 101 in its other end which is adapted to follow the periphery of an eccentric cam 102 by means of tension springs 103 being secured to arms 94 and 95 and having their other ends secured to spring perches 104, which spring perches are fixed on the end of a shaft 106 which is anchored by means of suitable set screws not shown in the bearings 105 so that by using a suitable pipe wrench, the shaft 106 can be slightly rotated to adjust the tension on the tension springs 103, and then the shaft 106 can be adjusted to position to hold this adjustment of the tension springs 103.

The eccentric cam 102 is fixed on a shaft 110 which is mounted in bearings 111 and 112 supported by the horizontal bars 8 and 9, respectively. This shaft 110 has a sprocket wheel 113 secured thereon on which is mounted a sprocket chain 114 which is also mounted on a sprocket wheel 115 disposed on a shaft 116 projecting from a gear reduction housing 117 which gear reduction housing has a shaft extending therefrom with a V-pulley thereon on which is mounted a V-belt 120 which is also mounted on a V-pulley 121 on the motor shaft of an electric motor 122 supported on a plate 123 which plate also supports the gear reduction box 117. This plate 123 is supported by angle bars 125 which are supported in turn by the horizontal struts 15 and 16.

Figures 3, 16:
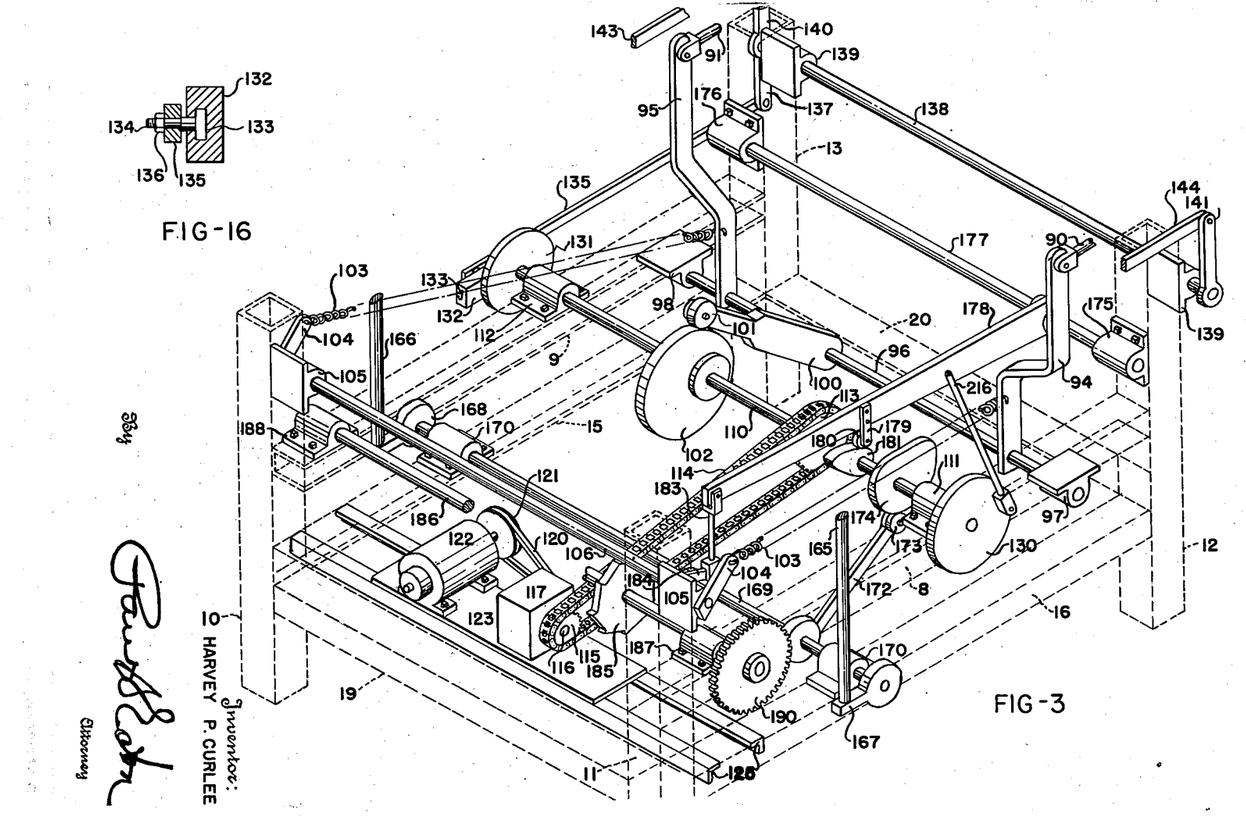
Figure 3 is an isometric view of the lower portion of the machine, omitting the endless conveyor, the hopper, and other parts.
Figure 16 is a sectional detail of the adjustable connection between wheel 131 and link 135.

The shaft 110 has mounted on the ends thereof discs 130 and 131. The disc 131 has secured thereto a block 132 having a T-shaped groove 133 therein in which is slidably mounted a bolt 134 (see Fig. 16), which bolt penetrates a link 135 and the bolt 134 has a nut 136 thereon by means of which the bolt 134 can be slid along the T-shaped groove 133, and the nut driven home to thereby adjust the throw of the link 135. The link 135 is connected to the lower end of a double ended lever 137 which is fixed on one end of the shaft 138 mounted in bearings 139 secured on the uprights 12 and 13, respectively. The uprising arm 140 of lever 137 and a lever or arm 141 secured on the other end of shaft 138 has links 143 and 144 respectively pivoted thereto, which links extend forwardly and are connected to a rounded portion on the ends of a squared shaft 146 secured to the rear surface of a hopper 147 by any suitable means such as screws 148. Also, oscillatably mounted on the rounded ends of the shaft 146 are downwardly projecting links 150 whose lower ends are oscillatably mounted in bearings 153 secured on the top surfaces of the horizontal bars 17 and 18.

It is thus seen that rotation of shaft 110 will cause oscillation of shaft 138 to move the hopper 147 forwardly and rearwardly as will be later explained.

Rising upwardly from the bars 17 and 18 are supports 155 and 156 which have pivoted thereto one end of trackways 157 and 158, each of which has a groove 159 therein for accommodating rollers 160 on each end of a squared shaft 161 secured to the front surface of the hopper 147 by any suitable means such as screws 162.

Pivoted to an intermediate portion of the trackways 157 and 158 are the upper ends of links 165 and 166 whose lower ends rest on crank arms 167 and 168, respectively, which crank arms are fixed on a shaft 169 mounted in bearing blocks 170 disposed on the horizontal bars 16 and 15. This shaft 169 has fixed thereon an arm 172 which has a roller 173 on its free end which is adapted to contact the periphery of a flattened cam 174 secured on a shaft 110. Rotation of shaft 110 therefore will oscillate shaft 169 which will cause the free ends of trackways 157 and 158 to rise at times during the operation of the apparatus.

Mounted in bearing blocks 175 and 176, mounted on the upright members 12 and 13, is an oscillatable shaft 177 having a lever 178 fixed thereto which extends forwardly and has a bracket 179 thereon in which is rotatably mounted a roller 180 which is adapted to follow the contour of a peculiarly shaped cam 181 mounted on shaft 110. The free end of lever 178 has depending in a pivotal manner therefrom a link 183 which has a dog 184 on its lower end which projects inwardly and engages a ratchet wheel 185 fixed on a shaft 186 rotatably mounted in suitable bearings 187 and 188 supported by the horizontal struts 8 and 9. This shaft 186 also has mounted thereon a sprocket wheel 190 on which a sprocket chain 191 is mounted, said sprocket chain extending upwardly and rearwardly and being mounted on a sprocket wheel 192 fixed on one end of shaft 29 whereby rotary motion in shaft 110 will oscillate lever 178 which will move ratchet wheel 185 one step to thus give a quick intermittent movement to the sprocket chains 32 and 33 of the endless conveyor.

Figure 4:
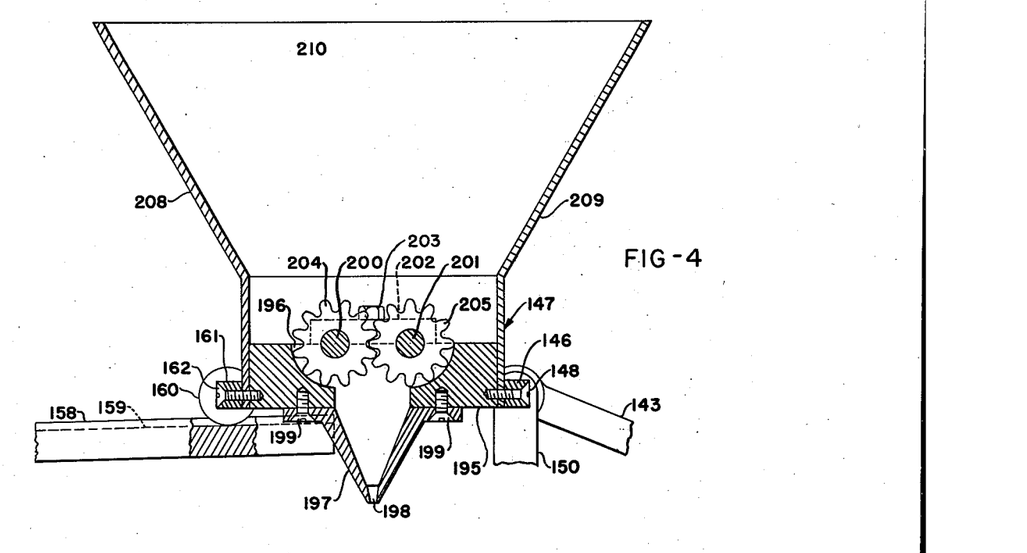
Figure 4 is a vertical sectional view through the hopper.
Figure 5:
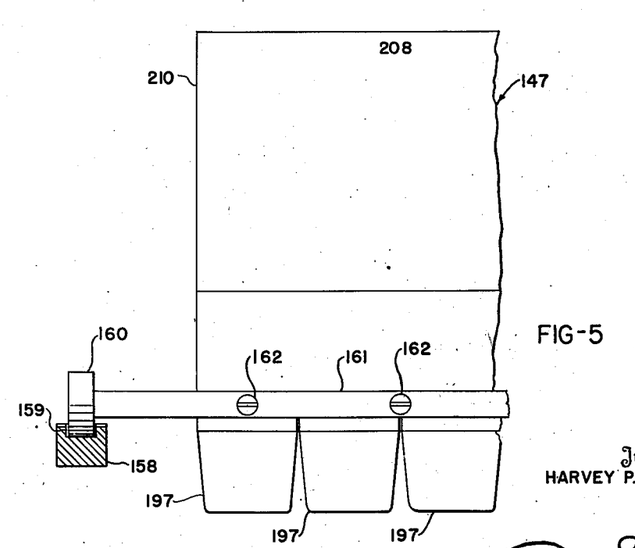
Figure 5 is an elevation, with parts in section, of one end of the hopper and showing the nozzles associated therewith.

This hopper has a non-corrosive bottom preferably of brass and indicated at 195. In this bottom, a plurality of pockets 196 are milled out and the lower ends of each of these pockets meshes with a nozzle 197 which has an orifice 198 through which the confectionery filling material is extruded. The nozzles 197 are secured to the bottom 195 by means of suitable screws 199. The partitions appearing between the pockets 196 as well as the end portions of this bottom 195 are milled out to provide a pair of semi-circular bearing portions in which shafts 200 and 201 are rotatably mounted. These shafts are confined in these semi-circular bearing portions by means of cap plates 202 being secured to the bottom 195 near each end thereof by any suitable means such as screws 203 penetrating the cap plate 202 and being threadably imbedded in the bottom. Disposed in each of these pockets 196 and fixedly mounted on the shaft 200 and 201 are gear wheels 204 and 205, respectively. These gear wheels mesh with each other with a relatively tight fit and one runs clockwise and the other runs counter-clockwise to feed the confectionery filling material along the arcuate walls of the pockets 196 into the nozzles 197.

Figures 11, 12, 13, 14:
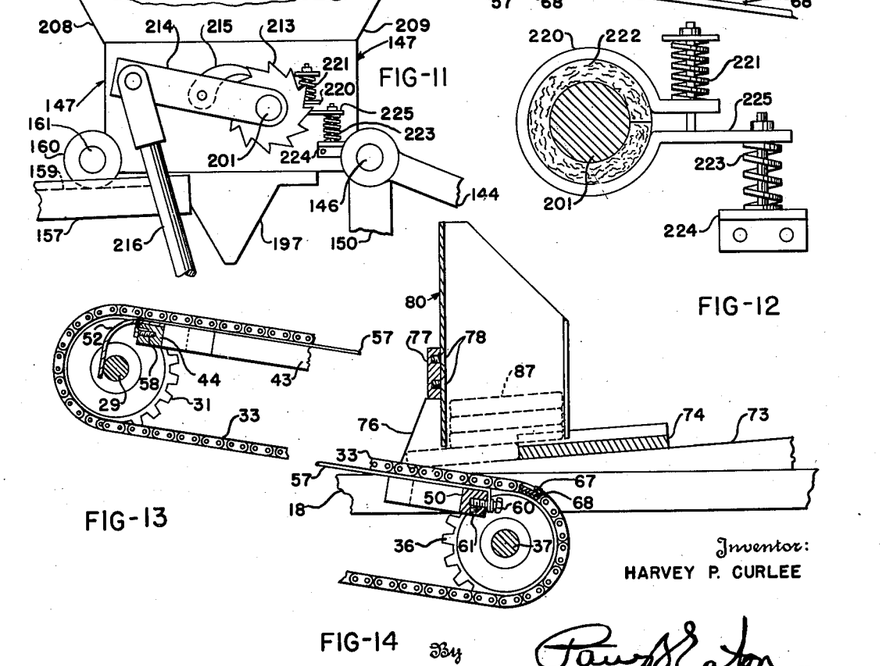
Figure 11 is a modified form of the hopper mechanism showing brake means associated with one of the shafts.
Figure 12 is a vertical sectional view taken immediately behind the ratchet wheel shown in Figure 11.
Figure 13 is a vertical sectional view taken along the line 13—13 in Figure 2.
Figure 14 is a vertical sectional view taken substantially along the line 14—14 in Figure 2.

The bottom has secured thereto front and rear walls 208 and 209, and end walls 210 and 211, respectively, which form the compartment for receiving a supply of the confectionery filling material. The shaft 201 projects beyond the side wall 211 and has fixedly secured thereon a ratchet wheel 213 and adjacent this ratchet wheel is oscillatably mounted an arm 214 which has a dog 215 pivoted thereon and adapted to rest by gravity on the ratchet wheel 213. The free end of arm 214 has pivoted thereto the upper end of a link 216, whose lower end is pivoted to the disc 130.

Where the nature of the filling material being handled, or the size or shape of the article being deposited requires more pronounced action to extend and break the body of the filling material properly, this action may be magnified according to the modification illustrated in Figures 11 and 12 of the drawings. As shown in Figure 11, this modification comprises the arrangement of a brake mechanism mounted in association with the shaft 201 for frictional resistance to rotation of the shaft in a delivery direction. The brake mechanism may suitably be arranged on the extending portion of shaft 201 which carries the pawl and ratchet mechanism. As illustrated more in detail in Figure 12, the brake mechanism may be constructed with a usual form of retaining collar 220 and provided with an adjusting spring assembly 221 for clamping the collar 220 and an associated friction lining 222 on the shaft 201 to impose the desired degree of frictional resistance. The mounting for the brake mechanism also includes a yieldable member, such as a spring 223, disposed for displacement by the frictional resistance of the brake mechanism to rotation of the shaft 201.

As shown in Figures 11 and 12, spring 223 is supported on a bracket 224 mounted on the end of the hopper 147 and is assembled with an extending arm 225 of the retaining collar 220. Accordingly, rotation of the shafts 200 and 201 for delivery of the filling material will cause the brake mechanism to shift, due to the above mentioned frictional resistance, and displace the spring 223 until it is compressed to the point where the reaction force overcomes the frictional resistance and causes the friction lining 222 to slip on the extending portion of shaft 201. The spring 223 will thus remain compressed until delivery of the filling material ceases at the end of a depositing operation. Then rotation of the feed rolls 204 and 205 stops at this time, however, the spring 223 will recover from the displacement to which it has been subjected and cause reverse rotation of the feed rolls 204 and 205. This reverse rotation will impress a suction on the body of filling material extending from the orifice 198 at the lower end of the nozzles 197 and will have the effect of drawing the filling material back into the nozzles and thus intensify the force exerted to break the extending stream of filling material remaining at the end of a depositing operation.

The articles deposited with filling material at the depositing station, as described above, advance beyond this point with the continued intermittent actuation of the conveyor mechanism to the discharge end of the machine. Here the deposited articles may be transferred by any convenient means for further processing such as wrapping or packaging and the like.

As the articles 87 are transferred from the magazine onto the endless conveyor by means of the plate 74, they are deposited on the lip 68 and with their rear ends abutting against the cross bars 67, and their forward ends rest on the wires 57 and the hopper 147 is operated so that filling material is distributed over the cakes 87 during the intermittent rest of the conveyor. The endless conveyor is moved in step-by-step relation as already described, and while this endless conveyor is at rest, the hopper 147 is also moving forwardly and when it has reached the forward limit of its movement, it is raised upwardly and reversed in direction and then the clutch mechanism shown in Figures 11 and 12, if present in the machine, would cause a reverse movement in the feeding mechanism to create a suction in the nozzles and assist in attenuating the filling material extending downwardly from the nozzles and assist in breaking it and thus the filling material will be doubled back slightly onto the previous filling material and thus a neat depositing will be effected.

Figure 6:
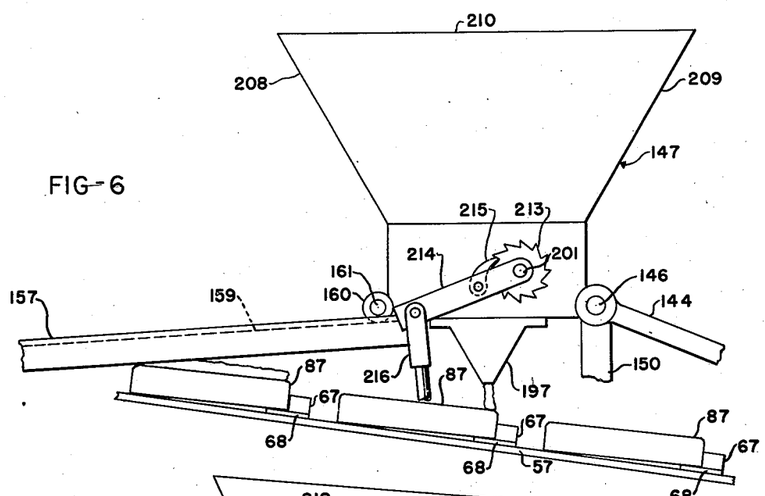
Figure 6 is an elevation of the confectionery filling depositing hopper in its initial position of depositing the filling onto a cake.

The manner in which this movement of the hopper 147 is carried out is shown progressively in the drawings. In Figure 6, the hopper 147 is shown at the beginning of the depositing operation just as actuation of the feeding gears 204 and 205 have begun their delivery of filling material through the orifice 198 onto the articles, which have been advanced to the position for depositing by the conveyor mechanism. The conveyor mechanism, as well as the article, such as cakes, wafers and the like indicated at 87, are at rest during the depositing operation, and distribution of the filling material over the surface of the articles is effected by the movement of the hopper through actuation of the link members 165 and 166 and by the shifting rollers 160 on the trackways 157 and 158.

Figure 7:
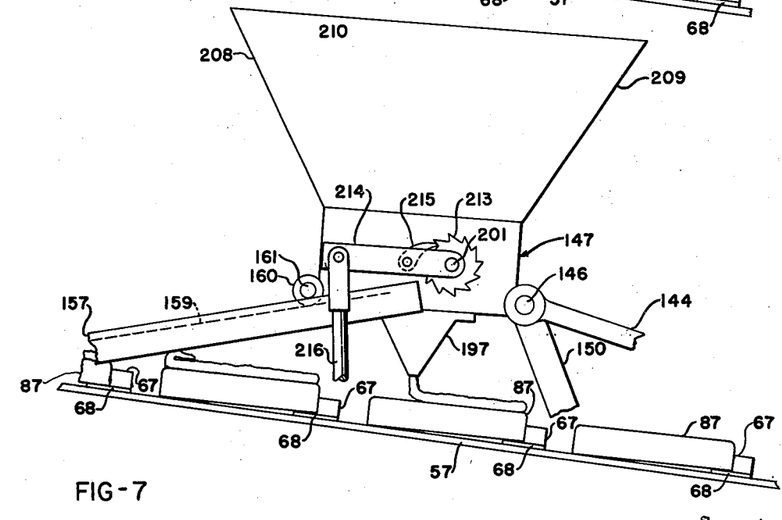
Figure 7 is a view similar to Figure 6, but showing the hopper advanced forwardly of the cakes.
Figure 8:
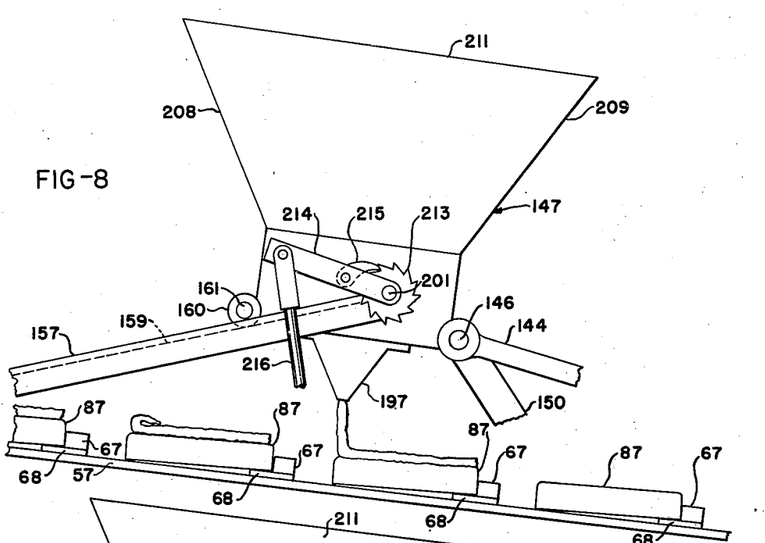
Figure 8 is a view similar to Figure 7, but showing the hopper at the end of its forward movement, and showing it in raised position.
Figure 9:
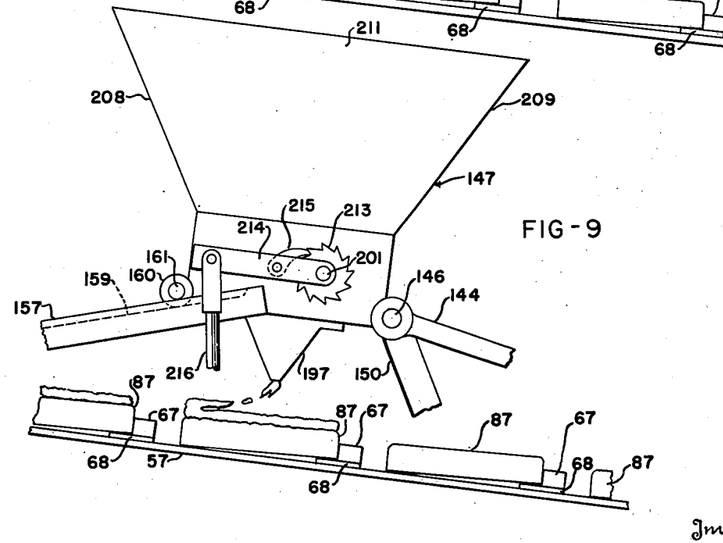
Figure 9 is a view similar to Figure 8, but showing the hopper moving rearwardly after having finished depositing the filling material onto a cake.
Figure 10:
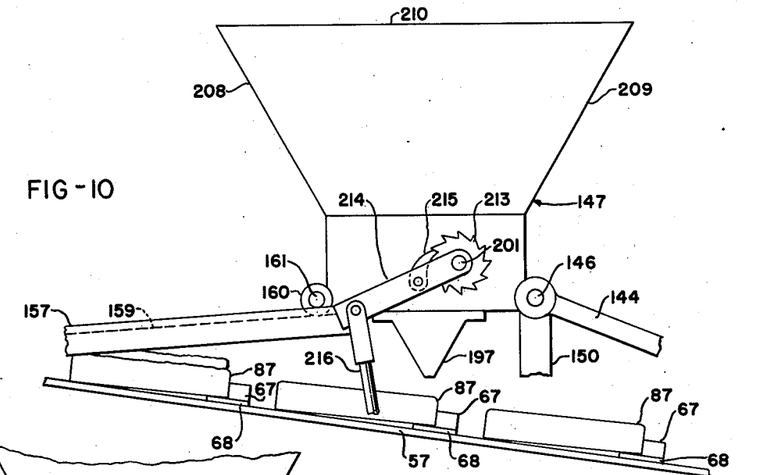
Figure 10 is a view similar to Figure 9, but showing the hopper and conveyor in position ready for the beginning of the depositing of the confectionery filling on a subsequent cake.

In Figure 7 the hopper is shown near the end of its forward movement and in Figure 8 the forward movement has ceased, but in the meantime the links 165 and 166 have been moved upwardly to raise the hopper and thus elongate the stream of filling material issuing from the orifice 198, and at this time, rearward movement of the hopper takes place as shown in Figure 9 to not only break the stream of filling material, but also to lap a portion thereof back onto the already deposited material. The hopper then moves back into the position shown in Figure 10 where it is ready for another depositing operation, after the conveyor has been advanced another step.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In a depositing machine for delivering a confectionery filling on articles to be deposited, the combination with a conveyor mechanism for advancing said articles intermittently past a depositing station, of a depositing mechanism at said station comprising a hopper adapted to contain a supply of filling material, means for delivering said filling material from said hopper onto said articles during the intermittent rest at said depositing station, and means for moving of said hopper comprising a supporting means at one side of said hopper and associated means for actuating said support means for moving of said hopper in the direction of advancement of said articles during delivery of filling material, and for return of said hopper to starting position during the intermittent advance of said articles by said conveyor structure, and a guideway disposed in supporting relation at the opposite side of said hopper to accommodate said moving of the hopper, and associated means for shifting said guideway upwardly following delivery of filling material over the surface of said articles to displace said hopper and thereby break the body of filling material extending between said delivery means and said articles.

2. In a depositing machine for delivering a confectionery filling on articles to be deposited, the combination with a conveyor mechanism for advancing said articles intermittently past a depositing station, of a depositing mechanism at said station comprising a hopper adapted to contain a supply of filling material, means for delivering said filling material from said hopper onto said articles during the intermittent rest at said depositing station, and means for moving said hopper in the direction of advancement of said articles during delivery of filling material and while the articles are at rest, and for returning the hopper to starting position during the intermittent advance of said articles by said conveyor structure.

3. In a depositing machine for delivering a confectionery filling onto articles to be deposited, a depositing mechanism comprising a hopper adapted to contain a supply of said filling material, a plurality of orifices associated with said hopper for forming and directing a body of filling material onto said article, a pair of fluted, intermeshing, feed rolls arranged in relation to each of said orifices for delivering filling material from said hopper through said orifices, and a brake mechanism mounted for frictional resistance to rotation of said feed rolls in delivery direction, the mounting for said brake mechanism including a yieldable member disposed for displacement by the frictional resistance to rotation of said feed rolls in delivery direction whereby a reverse rotation of said feed rolls is effected following delivery of filling material by recovery of said yieldable member from said displacement.

4. A depositing machine comprising a conveyor mechanism for supporting articles, means for intermittently moving the conveyor, for advancing articles to be deposited intermittently past a depositing station, a hopper at said depositing station adapted to contain a supply of confectionery filling, means for delivering said filling material from said hopper onto said articles during the intermittent rest at said depositing station, means for moving said hopper in the direction of advancement of said articles and during delivery of filling material while the conveyor is at rest whereby the filling material is distributed over the surface of said articles, and means for raising said hopper following delivery of filling material over the surface of said articles and thereby break the body of filling material extending between said delivery means and said articles.

5. A depositing machine comprising a conveyor mechanism, means for moving intermittently said conveyor for advancing articles to be deposited intermittently past a depositing station, a hopper at said depositing station adapted to contain a supply of confectionery filling, means for delivering said filling material from said hopper onto said articles during the intermittent rest at said depositing station, supporting means pivotally connected with said hopper at one side thereof, means for shifting said supporting means to thereby move said hopper relative to the articles during delivery of filling material to distribute said filling material over the surface of said articles, a guideway disposed in supporting relation at the opposite side of said hopper, and means for shifting said guideway following delivery of filling material over the surface of said articles to thereby displace said hopper to break the body of filling material extending between said delivery means and said articles.

6. A depositing machine comprising a hopper adapted to contain a supply of confectionery filling, means for supporting articles and intermittently moving same, means for delivering said filling from said hopper onto the articles while at rest, supporting means pivotally connected to said hopper at one side thereof, means for moving said supporting means and said hopper during delivery of filling material to distribute said filling material over the surface of said articles, a guideway disposed in supporting relation at the opposite side of said hopper, and means for shifting said guideway following delivery of filling material over the surface of said articles to thereby displace said hopper upwardly to break the body of filling material extending between said hopper and said articles.

7. In a depositing machine having a depositing mechanism for delivering a confectionery filling onto articles and having a conveyor for advancing the articles past the depositing mechanism, said depositing mechanism comprising a hopper adapted to contain a supply of filling, a gear pump for delivering said filling from the hopper onto the articles, means for imparting intermittent movement to the conveyor, means for actuating the gear pump intermittently, said gear pump comprising two spaced horizontally disposed shafts with intermeshing gears mounted thereon, a brake arrangement mounted on one of the shafts, spring means for clamping the brake arrangement on the shaft, a second spring means for resiliently securing the brake to the gear box whereby the shaft has frictional movement caused by the brake arrangement during the delivery of said filling and also creates a pressure against the second spring means to thus give the brake and the shaft and gears associated therewith a slight backward motion at the end of the delivering operation which results in drawing back the filling into the hopper thus causing it to break cleanly at the end of each delivering operation.

HARVEY P. CURLEE.

REFERENCES CITED

The following references are of record in the file of this patent:

UNITED STATES PATENTS

| Number | Name | Date |
|---|---|---|
| 493,403 | Holmes | Mar. 14, 1893 |
| 1,570,405 | Salerno | Jan. 19, 1926 |
| 1,771,117 | Greer | July 22, 1930 |
| 2,206,313 | Werner | July 2, 1940 |